3,148,114
METHOD OF REDUCING CHOLESTEROL LEVELS
Marvin J. Fahrenbach and Benjamin A. Riccardi, Pearl River, N.Y., assignors to American Cyanamid Company, New York, N.Y., a corporation of Maine
No Drawing. Filed Nov. 20, 1959, Ser. No. 854,225
10 Claims. (Cl. 167—55)

This invention relates to new compositions of matter. More particularly, it relates to therapeutic compositions containing mucilaginous substances which operate as adjuvants and which result in a lowering of blood cholesterol.

Cholesterol is a naturally occurring sterol found in animals and humans, and is present in all animal fats and oils. Cholesterol has been known to be present in atherosclerotic lesions (plaques) since the middle of the nineteenth century. The composition of the plaques is now known to be largely cholesterol, fatty acid esters of cholesterol, phosphatides, neutral fats, and dihydrocholesterol. Dihydrocholesterol is one of the end products of the metabolism of cholesterol. Cholesterol is always present as a major ingredient in the plaques and it is currently believed that cholesterol is a prime factor in the development of atherosclerosis. Hypercholesterolemia is the term used to describe the presence of high levels of cholesterol in blood serum.

It has been observed that cholesterol of dietary origin is present in atherosclerotic lesions. Restricting the diet in regard to cholesterol and also to fats is looked upon with favor by some investigators for the prevention of atherosclerosis, and is regarded as of less importance by others. It has been reported that humans can synthesize cholesterol from simpler compounds such as acetone, acetic acid, and squalene. By the use of the isotope tracer method, it has been discovered that cholesterol is synthesized by practically every tissue in the body from any food-stuff. Thus, it is evident that dietary restrictions alone cannot be expected to be successful in all cases of hypercholesterolemia.

In the past, attempts have been made to lower the level of cholesterol in the blood serum by the oral feeding of various substances which have been generally referred to in the art as hypocholesterolemic adjuvants. Typical of such substances are pectin, lecithin, and corn oil.

According to the present invention, we have found 13 mucilaginous substances which exert a more powerful hypocholesterolemic adjuvant action than those which have been used before. The adjuvants of the present invention, with a description of each, are listed below and are numbered 1 to 13.

NAMES AND DESCRIPTIONS OF THE ADJUVANTS USED IN THIS INVENTION (1) Irish moss—the dried and bleached plant of *Chondrus crispus*, a dark purple cartilaginous seaweed from the coast of Ireland. Irish moss is also termed carragheen.
(2) Gum tragacanth—the dried, gummy exudation from *Astragalus gummifer* or other Asiatic species of Astragalus found largely in Iran, also in Asia Minor and in Syria.
(3) Agar—the dried muclinaginous substance extracted from marine algae or seaweed such as *Gelidium corneum*. It occurs in bundles of thin, transparent membranes or yellowish white threads which are insoluble in cold water; in hot water the threads slowly swell and dissolve.
(4) Dextran—carbohydrate slimes originating from sugar syrups such as are found in crystallizing tanks of sugar refineries, from fermenting vegetables and dairy products. Dextran is produced by the action of certain strains of chain-forming cocci such as *Leuconostoc dextranicum* on sucrose.
(5) Locust bean gum—the thick, mucilaginous excretion from the bean of the locust tree (*Robinia pseudacacia*) of semi-desert North America.
(6) Alginic acid—a protein of marine algae, obtained as a by-product in the preparation of iodine from kelps, principally from *Laminaria digitata*.
(7) Gum karaya—the dried exudate of the tree *Sterculia urens*, found in India, especially in the Gujerat region and in the central provinces.
(8) Gum ghatti—the gummy exudate from the stems of *Anogeissus latifolia*, abundant in India and Ceylon.
(9) Gum shiraz—the gummy exudate from *Prunus ebulus* or wild almond tree found in the Shiraz district of Southern Iran.
(10) Salep root—the dried tubers of several species of Orchidaceae from Asia Minor.
(11) Guar gum—the ground endosperms of *Cyanopsis tetragonoloba* which is cultivated in India as livestock feed. Guar gum is a light gray powder, dispersible in hot or cold water.
(12) Whole psyllium husks—the ground husks of the seeds of *Plantago psyllium*.
(13) Carob flour—the ground pods of *Ceratonia siligua*, a Leguminosae, rich in sugar and gum; used as fodder. Carob flour is sometimes known as Saint John's Bread.

It is not known how the adjuvants of the present invention operate. They are chemically so widely different that it may well be that different mechanisms operate with different adjuvants. Their chemical differences are so marked that they are not in any sense chemically equivalent, their only equivalence being the fact that they are all hypocholesterolemic adjuvants and they are all mucilaginous substances. No theory of why these diverse compounds operate is advanced. It is not intended that the present invention should be limited to any theory as to mechanism.

The method of administering the mucilaginous substances of the present invention is limited to oral administration. The mucilaginous adjuvants of the present invention may be orally administered, for example, with an inert diluent or with an assimilable edible carrier, or they may be enclosed in hard or soft gelatin capsules, or they may be compressed into tablets, or they may be incorporated directly with the food of the diet. It is an advantage of the present invention that the muscilaginous adjuvants may be orally administered in any convenient manner.

The amount of a single dose or of a daily dose to be given will vary with the size of the man or animal to be treated, but should be such as to give a proportionate dosage of from 50 milligrams to 500 milligrams per kilogram of body weight per day. In terms of total weight of mucilaginous adjuvant, this is usually from about 5 grams to about 30 grams per dosage unit. As indicated previously, in one embodiment of our invention, it is preferred to incorporate the mucilaginous adjuvant directly in the food of the diet. Any suitable method for dispersing the mucilaginous substance uniformly throughout the food can be used. The amount of mucilaginous substance added to the diet may be varied but it is ordinarily found that an amount within the range of about 5 grams to about 30 grams per kilogram of diet promotes the maximum lowering of blood cholesterol.

The following examples illustrate the hypocholesterolemic effect of the novel compositions of the present invention and the method of administering them whereby a lowering of blood cholesterol is obtained.

White Leghorn cockerels were fed the following cholesterol containing basal diet for 27 days.

| | |
|---|---|
| Sucrose _____ g-- | 57 |
| Casein _____ g-- | 20 |
| Gelatin _____ g-- | 8 |
| Calcium gluconate _____ g-- | 5 |
| Cholesterol _____ g-- | 3 |
| Corn oil _____ g-- | 3 |
| Salt mixture _____ g-- | 2 |
| Bone ash _____ g-- | 2 |
| L-cystine _____ g-- | 0.4 |
| Choline chloride _____ g-- | 0.2 |
| Inositol _____ g-- | 0.1 |
| Niacinamide _____ mg-- | 5 |
| Calcium pantothenate _____ mg-- | 5 |
| Thiamine _____ mg-- | 1 |
| Riboflavin _____ mg-- | 1 |
| Pyridoxine _____ mg-- | 1 |
| Menadione sodium bisulfite _____ mg-- | 0.5 |
| Folic Acid _____ mg-- | 0.5 |
| Tocopherol acetate _____ mg-- | 0.5 |
| Biotin _____ μg-- | 20 |
| Vitamin $B_{12}$ _____ μg-- | 5 |
| Vitamin A _____ units-- | 1000 |
| Vitamin D _____ do---- | 200 |

In each of the following examples, a control group of cockerels were fed the basal diet alone, whereas other groups of cockerels were fed the basal diet plus from 10 to 30 grams of a mucilaginous adjuvant per kilogram of basal diet. At the end of 27 days, the average value of the milligrams of cholesterol per 100 milliliters of blood plasma was determined for each group of cockerels by the "Trinder" assay procedure [Trinder, P., Analyst 77, 321 (1952)].

*Example 1*

TEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 564 |
| 2 | 30—Irish Moss | 221 |
| 3 | 30—Gum Tragacanth | 355 |

*Example 2*

TEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 491 |
| 2 | 10—Irish Moss | 464 |
| 3 | 30—Irish Moss | 244 |
| 4 | 30—Gum Tragacanth | 330 |

*Example 3*

ELEVEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 463 |
| 2 | 30—Agar | 353 |
| 3 | 30—Dextran | 333 |

*Example 4*

TEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 657 |
| 2 | 30—Guar Gum | 218 |
| 3 | 30—Irish Moss | 222 |

*Example 5*

TEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 434 |
| 2 | 30—Locust Bean Gum | 224 |
| 3 | 30—Alginic Acid | 353 |

*Example 6*

TEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 539 |
| 2 | 10—Guar Gum | 311 |
| 3 | 30—Guar Gum | 163 |
| 4 | 10—Irish Moss | 234 |
| 5 | 20—Irish Moss | 247 |
| 6 | 30—Irish Moss | 222 |

*Example 7*

ELEVEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 602 |
| 2 | 30—Agar | 453 |
| 3 | 30—Dextran | 424 |

*Example 8*

TEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 535 |
| 2 | 30—Gum Karaya | 291 |
| 3 | 30—Gum Ghatti | 283 |
| 4 | 30—Gum Shiraz | 365 |

*Example 9*

TWELVE WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 545 |
| 2 | 30—Salep Root | 209 |
| 3 | 30—Gum Tragacanth | 229 |
| 4 | 30—Guar Gum | 210 |
| 5 | 30—Gum Karaya | 198 |

Example 10

TEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 528 |
| 2 | 30—Whole Psyllium Husks | 240 |
| 3 | 30—Carob Flour | 384 |

Example 11

TEN WHITE LEGHORN COCKERELS PER GROUP

| Group of cockerels | Grams of Mucilaginous Adjuvant per kg. of basal diet | Mg. Cholesterol per 100 ml. of blood plasma after 27 days |
|---|---|---|
| 1 | 0—Control | 540 |
| 2 | 30—Agar | 435 |
| 3 | 30—Alginic Acid | 419 |
| 4 | 30—Whole Psyllium Husks | 355 |
| 5 | 30—Gum Karaya | 260 |
| 6 | 30—Irish Moss | 272 |
| 7 | 30—Salep Root | 194 |

What is claimed is:

1. The method of lowering blood cholesterol which comprises administering in oral dosage unit form from 50 mg. to 500 mg. per kilogram of body weight per day of Irish moss.

2. The method of lowering blood cholesterol which comprises administering in oral dosage unit form from 50 mg. to 500 mg. per kilogram of body weight per day of gum tragacanth.

3. The method of lowering blood cholesterol which comprises administering in oral dosage unit form from 50 mg. to 500 mg. per kilogram of body weight per day of locust bean gum.

4. The method of lowering blood cholesterol which comprises administering in oral dosage unit form from 50 mg. to 500 mg. per kilogram of body weight per day of gum karaya.

5. The method of lowering blood cholesterol which comprises administering in oral dosage unit form from 50 mg. to 500 mg. per kilogram of body weight per day of gum ghatti.

6. The method of lowering blood cholesterol which comprises administering in oral dosage unit form from 50 mg. to 500 mg. per kilogram of body weight per day of gum shiraz.

7. The method of lowering blood cholesterol which comprises administering in oral dosage unit form from 50 mg. to 500 mg. per kilogram of body weight per day of salep root.

8. The method of lowering blood cholesterol which comprises administering in oral dosage unit form from 50 mg. to 500 mg. per kilogram of body weight per day of guar gum.

9. The method of lowering blood cholesterol which comprises administering in oral dosage unit form from 50 mg. to 500 mg. per kilogram of body weight per day of whole psyllium husks.

10. The method of lowering blood cholesterol which comprises administering in oral dosage unit form from 50 mg. to 500 mg. per kilogram of body weight per day of carob flour.

References Cited in the file of this patent

UNITED STATES PATENTS

| | | |
|---|---|---|
| 2,850,428 | Seifter et al. | Sept. 2, 1958 |
| 2,854,376 | Hardt | Sept. 30, 1958 |

OTHER REFERENCES

Cecil et al.: Textbook of Medicine, 10th ed., 1959, pp. 641–648.

Hawk et al.: Practical Physiological Chemistry, 12th ed., 1947, page 535.

British Med. J., p. 1424, Dec. 6, 1958.

Frohlich et al.: Nature, Apr. 18, 1959, 183 (4668), pages 1119–20.

Bragdon: The Amer. J. of Physiology, 189:1, April 1957.

Zollner: Hope-Seyler's Zeit für Physiol. Chemie, Mar. 17, 1957, pp. 112–123.

Gray: Amer. J. of Digestive Dis., 8:4, April 1941, pp. 130–139.

Universal Formulary, Blanchard & Lea, Philadelphia, 1854, p. 487.

Veg. Gums and Resins, Chronica Botanica Co., Waltham, Mass., 1949, pp. 44–47, 54, 55.

Whistler: Industrial Gums, Academic Press, 1959 (rec'd Sept. 28), pp. 321–328, 331.

U.S. Disp., J. B. Lippincott, Philadelphia, 24th ed., 1947, pp. 4–6, 29, 30, 271, 272, 900, 901, 1233, 1234, 1470–1472.

U.S. Disp., 25th ed., 1955, pp. 1250, 1251, 1812, 1813.